(12) United States Patent
Yoshinaga

(10) Patent No.: US 7,096,045 B2
(45) Date of Patent: Aug. 22, 2006

(54) PORTABLE COMMUNICATION TERMINAL APPARATUS

(75) Inventor: Masahiko Yoshinaga, Shizuoka (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 09/946,315

(22) Filed: Sep. 5, 2001

(65) Prior Publication Data

US 2002/0028662 A1    Mar. 7, 2002

(30) Foreign Application Priority Data

Sep. 7, 2000   (JP)   ............................. 2000-271685

(51) Int. Cl.
*H04B 1/38* (2006.01)

(52) U.S. Cl. .................. 455/567; 455/403; 455/575.3; 379/433.13

(58) Field of Classification Search ............... 455/90, 455/403, 406, 413, 412, 422, 482, 564, 567, 455/566, 550, 575; 379/433.13
See application file for complete search history.

(56) References Cited

U.S. PATENT DOCUMENTS

| | | | | |
|---|---|---|---|---|
| 5,638,455 | A  * | 6/1997 | Peiker | 381/361 |
| 6,018,671 | A  * | 1/2000 | Bremer | 455/567 |
| 6,301,338 | B1 * | 10/2001 | Makela et al. | 379/88.21 |
| 6,327,482 | B1 * | 12/2001 | Miyashita | 455/566 |
| 6,330,461 | B1 * | 12/2001 | Andersson | 455/566 |
| 6,438,392 | B1 * | 8/2002 | Toba | 455/567 |
| 6,449,359 | B1 * | 9/2002 | Luzzatto et al. | 379/373.01 |
| 6,928,307 | B1 * | 8/2005 | Ohtsuki | 455/567 |

FOREIGN PATENT DOCUMENTS

| | | |
|---|---|---|
| JP | 62-142444 | 6/1987 |
| JP | 7-203526 | 8/1995 |
| JP | 8-126061 | 5/1996 |
| JP | 8-228382 | 9/1996 |
| JP | 9-8874 | 1/1997 |
| JP | 9-69865 | 3/1997 |
| JP | 2850794 | 11/1998 |
| JP | 11-112622 | 4/1999 |
| JP | 2944582 | 6/1999 |
| JP | 11-187091 | 7/1999 |
| JP | 11-215231 | 8/1999 |
| JP | 2000-232501 | 8/2000 |
| JP | 2002-77313 | 3/2002 |

* cited by examiner

*Primary Examiner*—Fan Tsang
*Assistant Examiner*—Md. Shafiad Alam Elahee
(74) *Attorney, Agent, or Firm*—Michael Best & Friedrich LLP

(57) ABSTRACT

A portable communication terminal apparatus is disclosed which can announce termination of a call in various methods with a simple configuration and allows selection of a suitable annunciation method in accordance with a utilization situation of the portable communication terminal apparatus so that an annunciation operation can be performed appropriately thereby achieve reduction of the power consumption and the noise generation. An unfolded/folded state of a body of a foldable portable telephone set is supervised by an unfolded/folded state detection section. When an annunciation operation is to be performed upon termination of a call or the like, an annunciation method determination section selects one of a plurality annunciation methods stored in a storage section in response to the unfolded/folded state of the portable telephone set. A control section controls an annunciation section to drive a vibrator, a speaker or an LED to perform an annunciation operation in accordance with the selected annunciation method.

15 Claims, 6 Drawing Sheets

FIG. 3

| ANNUNCIATION METHOD | ANNUNCIATION DEVICE | ANNUNCIATION SOUND VOLUME | ANNUNCIATION PATTERN |
|---|---|---|---|
| A | SINGING | 3 | α |
| B | SINGING | 1 | β |

FIG. 4

| ANNUNCIATION METHOD | ANNUNCIATION DEVICE | ANNUNCIATION SOUND VOLUME | ANNUNCIATION PATTERN |
|---|---|---|---|
| A | SINGING | 3 | α |
| B | VIBRATION | — | — |

FIG. 5

| ANNUNCIATION METHOD | ANNUNCIATION DEVICE | ANNUNCIATION SOUND VOLUME | ANNUNCIATION PATTERN | ANNUNCIATION TIME |
|---|---|---|---|---|
| A | SINGING | 1 | α | 5 SECONDS |
| B | SINGING | 1 | α | 2 SECONDS |

FIG. 7

| ANNUNCIATION METHOD | ANNUNCIATION DEVICE | ANNUNCIATION SOUND VOLUME | ANNUNCIATION PATTERN | ANNUNCIATION TIME |
|---|---|---|---|---|
| A | SINGING AND EMISSION OF LIGHT | 3 | α | 5 SECONDS |
| B | SINGING | 1 | β | 3 SECONDS |
| C | VIBRATION OR EMISSION OF LIGHT | — | — | 1 SECONDS |

PORTABLE COMMUNICATION TERMINAL APPARATUS

BACKGROUND OF THE INVENTION

1. Field of the Invention

The present invention relates to a portable communication terminal apparatus such as a portable telephone set, a personal handy-phone system (PHS) or a personal digital assistant, and more particularly to annunciation of a portable communication terminal by generation of sound, emission of light, generation of vibrations or a display.

2. Description of the Related Art

Conventionally, an annunciation apparatus for a foldable communication terminal apparatus is known wherein, in order to improve the foldable communication terminal apparatus in terms of the problem that much time is required for an operation to respond to a call termination annunciation operation while the foldable communication terminal apparatus is in a folded state, an annunciation operation is stopped by a simple operation of the foldable communication terminal apparatus to achieve reduction of the noise generation and the power consumption.

For example, a portable telephone set is disclosed in Japanese Patent Laid-Open No. 203526/1995 wherein a switch for stopping call termination annunciation sound is provided at a position at which the user can depress the switch even when the portable telephone set is in a folded state so that an annunciation operation of the portable telephone set can be stopped immediately. Another portable telephone set is disclosed in Japanese Patent No. 2850794 wherein annunciation sound is stopped or the volume of annunciation sound is decreased only if the body of the telephone set is unfolded during a call termination annunciation operation of the telephone set. A further portable telephone set is disclosed in Japanese Patent No. 2944582 wherein an annunciation operation is stopped and talking can be started only if the body of the telephone set is unfolded. A still further portable telephone set is disclosed in Japanese Patent Laid-Open No. 126061/1996 wherein two call termination annunciation methods including a ringer call termination annunciation method and a vibrator call termination annunciation method are prepared in advance and one of the call annunciation methods is used for call termination in response to a folded/unfolded state of a cover or communication control information. A radio communication system is disclosed in Japanese Patent Laid-Open No. 228382/1996 wherein, upon termination of a call, a termination ID number is transmitted from a radio base station to a termination side PHS terminal and the PHS terminal announces the call termination by one of four methods in response to the termination ID.

In the portable telephone sets disclosed in Japanese Patent Laid-Open No. 203526/1995, Japanese Patent No. 2850794 and Japanese Patent No. 2944582, an annunciation operation is performed using a fixed annunciation method irrespective of a utilization situation of the portable telephone set. Therefore, in such a situation that the user can recognize an annunciation given by a little annunciation operation such as when the portable telephone set is operated in an unfolded state, an annunciation operation is performed wastefully for an unnecessarily long period of time. Although this is a mere short time, the annunciation sound makes noise to surrounding people.

On the other hand, although the portable telephone set disclosed in Japanese Patent Laid-Open No. 126061/1996 can detect a folded/unfolded state of the cover and allows selection of the ringer call termination annunciation method or the vibrator call termination annunciation method, since only the two limited call termination annunciation methods are used fixed, the portable telephone set has a problem in that it cannot provide various manners of call termination annunciation suitable for various modes of use.

Meanwhile, the radio communication system disclosed in Japanese Patent Laid-Open No. 228382/1996 has a problem in that it has a complicated system configuration because a termination ID number is transmitted from a radio base station to a call termination side PHS terminal.

SUMMARY OF THE INVENTION

It is an object of the present invention to provide a portable communication terminal apparatus which can announce termination of a call in various methods with a simple configuration and allows selection of a suitable annunciation method in accordance with a utilization situation of the portable communication terminal apparatus so that an annunciation operation can be performed appropriately thereby achieving a reduction of the power consumption and noise generation.

In order to attain the object described above, according to an aspect of the present invention, there is provided a portable communication terminal apparatus having a foldable body, comprising annunciation means for performing an annunciation operation, storage means for storing a plurality of annunciation methods, unfolded/folded state detection means for supervising opening or closing of the body, annunciation method determination means for selecting one of the annunciation methods stored in the storage means in response to an unfolded/folded state of the body detected by the unfolded/folded state detection means, control means for controlling, when annunciation is necessary, the annunciation means to perform an annunciation operation in accordance with the annunciation method selected by the annunciation method determination means, and manually operable inputting means, the annunciation methods stored in the storage means being capable of being rewritten arbitrarily through the inputting means.

According to another aspect of the present invention, there is provided a portable communication terminal apparatus having a foldable body, comprising annunciation means for performing an annunciation operation, storage means for storing a plurality of annunciation methods, unfolded/folded state detection means for supervising opening or closing of the body, annunciation method determination method for selecting one of the annunciation methods stored in the storage means in response to an unfolded/folded state of the body detected by the unfolded/folded state detection means, control means for controlling, when annunciation is necessary, the annunciation means to perform an annunciation operation in accordance with the annunciation method selected by the annunciation method determination means, manually operable inputting means, and time counting means for counting time within which the inputting means is not operated after it is detected by the unfolded/folded state detection means that the body is in an unfolded state, the annunciation method determination means selecting, when the body is in an unfolded state, one of the annunciation methods stored in the storage means based on the time counted by the time counting means.

The annunciation means may include a sounding body, and the annunciation methods stored in the storage means may include at least one changeable parameter which is an annunciation sound volume, an annunciation pattern or an annunciation time of the sounding body.

Or, the annunciation means may include a sounding body and a vibrator, and the annunciation methods stored in the storage means may include an annunciation method wherein both of the sounding body and the vibrator are operated and another annunciation method or methods wherein one of the sounding body and the vibrator is operated.

Or else, the annunciation means may include a sounding body and a light emitting element, and the annunciation methods stored in the storage means may include an annunciation method wherein both of the sounding body and the light emitting element are operated and another annunciation method or methods wherein one of the sounding body and the light emitting element is operated.

Both of the portable communication terminal apparatus are advantageous in that various annunciation operations can be performed with a simple configuration. Further, a suitable annunciation operation can be selectively used in accordance with a situation of the use of the portable communication terminal apparatus, and this prevents an unnecessary annunciation operation from being performed and achieves reduction in power consumption and noise generation.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 3 to 5 are tables illustrating different combinations of annunciation methods which can be used by the foldable portable communication terminal apparatus of FIG. 1;

FIG. 7 is a table illustrating another different combination of annunciation methods which can be used by the foldable portable communication terminal apparatus of FIG. 1.

DESCRIPTION OF THE PREFERRED EMBODIMENT

Figure 1:
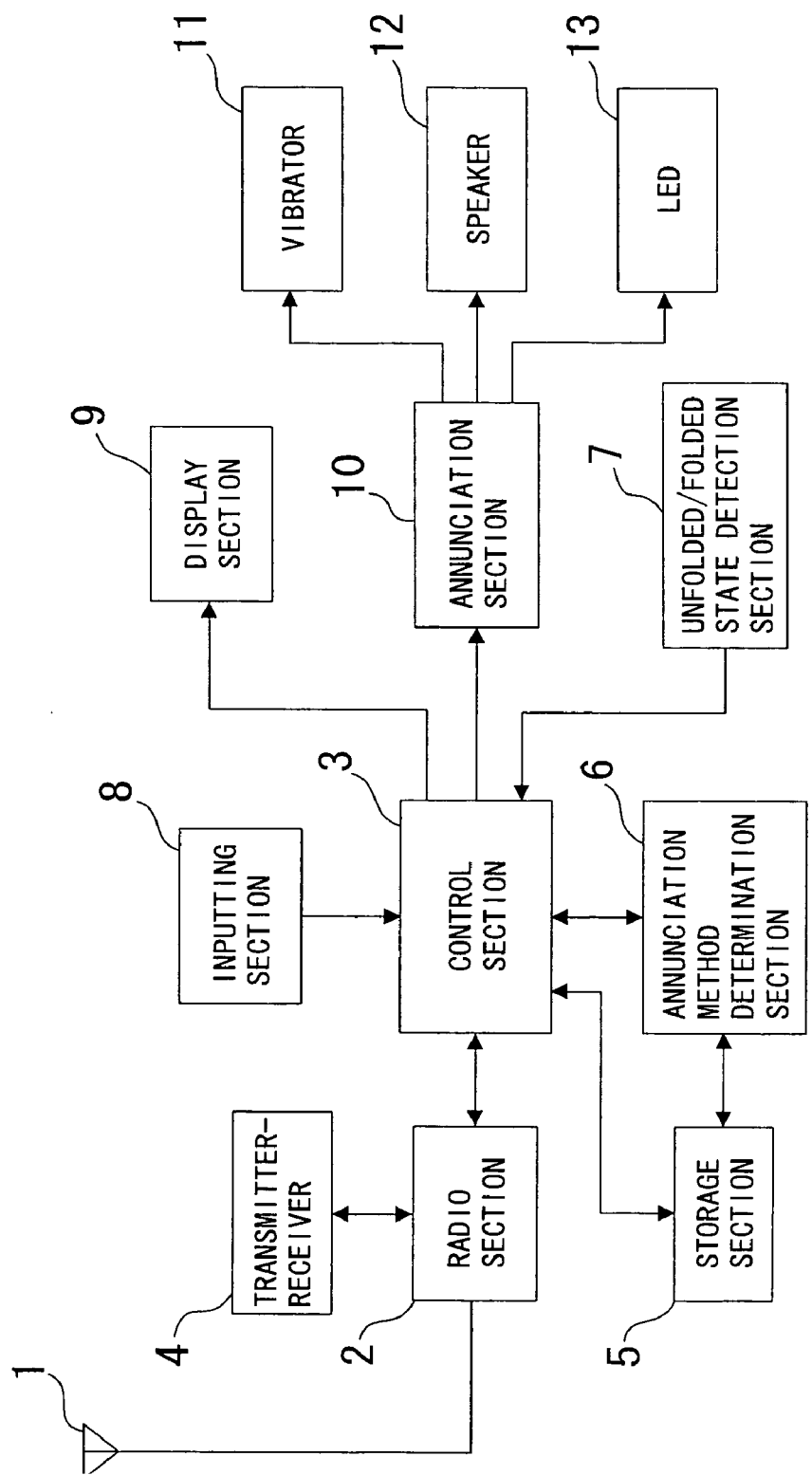
FIG. 1 is a block diagram of a foldable portable communication terminal apparatus to which the present invention is applied.

Referring first to FIG. 1, there is shown a configuration of a foldable portable communication terminal apparatus such as, for example, a portable telephone set to which the present invention is applied. Though not shown in the drawings, the foldable portable communication terminal apparatus has such a known mechanical structure that a body thereof is formed as a housing of two parts connected for pivotal motion to each other by means of a hinge.

The foldable portable telephone set includes a radio section 2 which forms transmitting and receiving means for transmitting and receiving a radio signal through a base station (not shown) and an antenna 1, a control section 3 which forms control means for controlling the entire portable telephone set, a transmitter-receiver 4 which forms communication means for inputting and outputting voice when a channel is established, a storage section 5 which forms storage means for storing several kinds of information involved in transmission and reception including a plurality of annunciation methods, an annunciation method determination section 6 which forms annunciation method determination means for determining an annunciation method for an annunciation operation upon termination of a call from a folded or unfolded state of the body of the portable telephone set, an unfolded/folded state detection section 7 which forms unfolded/folded state detection means for supervising an unfolding/folding movement of the body the portable telephone set, a manually operable inputting section 8 which forms inputting means through which several kinds of information relating to the portable telephone set are inputted, a display section 9 which forms display means for displaying several kinds of information when data are inputted or upon termination or origination of a call, an annunciation section 10 which controls singing, emission of light or vibration operation in an annunciation operation, a vibrator 11 which performs annunciation by vibration upon annunciation operation, a speaker 12 serving as a sounding body which performs annunciation by sound, and a light emitting diode (LED) 13 serving as a light emitting element which performs annunciation by emission of light. The inputting section 8 is used by a user of the portable telephone set to rewrite an information method stored in the storage section 5 or input several kinds of information such as dial setting for the portable telephone set. The annunciation section 10, vibrator 11, speaker 12, and LED 13 form an annunciation means.

In the following, an outline of operation of the foldable portable communication terminal apparatus is described with reference to FIG. 1.

The antenna 1 receives a radio signal from the base station and notifies the radio section 2 of the radio signal, The radio section 2 performs a demodulation process and a decoding process for the received radio signal and signals it to the control section 3. The control section 3 discriminates whether or not the decoded signal is a call signal. If the decoded signal is a call signal, then the control section 3 controls the annunciation method determination section 6 to determined an annunciation method for a current termination annunciation operation based on a current unfolded/folded state of the body of the portable telephone set. The annunciation method determination section 6 selects a suitable annunciation method from annunciation methods stored in advance in the storage section 5 based on the unfolded/folded state of the body of the portable telephone set. The control section 3 controls the annunciation section 10 to perform a termination annunciation operation in accordance with the annunciation method determined by the annunciation method determination section 6. If necessary, the control section 3 simultaneously requests the display section 9 to display the termination information and so forth. The annunciation section 10 receives the request from the control section 3 and performs a termination annunciation operation in accordance with the annunciation method determined by the annunciation method determination section 6. The vibrator 11, speaker 12 and LED 13 performs an annunciation operation under control of the annunciation section 10.

If a termination responding operation of the user is performed through the inputting section 8 during the termination annunciation operation by the annunciation section 10, then the control section 3 outputs a termination response signal to the radio section 2. The radio section 2 performs an encoding process and a demodulation process for the termination response signal and transmits a resulting radio signal to the base station through the antenna 1. Consequently, the portable telephone set can be placed into a talking state. Thereafter, the user can talk with the base station or another telephone set using the transmitter-receiver 4. The unfolded/folded state detection section 7 always supervises the unfolded/folded state of the portable telephone set. If the unfolding or folding operation is performed, then the unfolded/folded state detection section 7 announces this to the control section 3.

Figure 2:
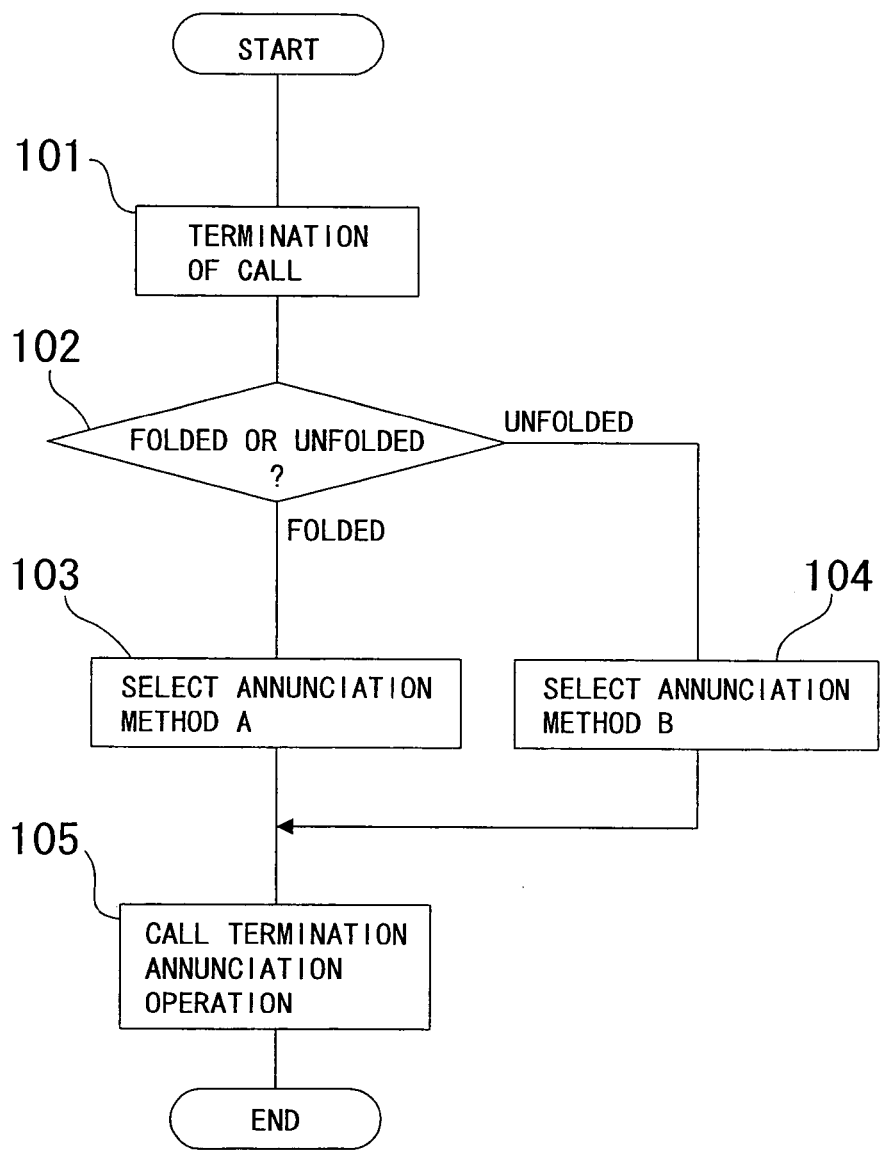
FIG. 2 is a flow chart illustrating a process executed by the foldable portable communication terminal apparatus of FIG. 1.

FIG. 2 illustrates a process of the foldable portable communication terminal apparatus shown in FIG. 1.

Referring to FIGS. 1 and 2, if the control section 3 receives a call signal through the antenna 1 and the radio section 2 (step 101), then it requests the annunciation method determination section 6 to determine an annunciation method to be used based on an unfolded/folded state of the body of the portable telephone set at present detected by the unfolded/folded state detection section 7. The annunciation method determination section 6 receives the request from the control section 3, selects an annunciation method to be used in the termination annunciation operation at present from the annunciation methods stored in the storage section 5 in accordance with the unfolded/folded state of the body of the portable telephone set detected by the unfolded/folded state detection section 7, and reports the determined annunciation method to the control section 3 (step 102). If it is assumed here that two different annunciation methods including a method A and another method B which has a lower annunciation capacity but exhibits lower power consumption than the method are stored in the storage section 5, then the annunciation method determination section 6 selects the annunciation method A when the body of the portable telephone set is in a folded state (step 103), but selects the annunciation method B when the body of the portable telephone set is in an unfolded state. Then, the control section 3 receives the report and controls the annunciation section 10 to perform a termination annunciation operation in accordance with the determined annunciation method (step 105).

FIG. 3 is a table illustrating an example of the annunciation methods stored in the storage section 5. Operation of the foldable portable communication terminal apparatus is described in more detail below with reference to FIGS. 1 to 3.

The annunciation method determination section 6 determines an annunciation method to be used in an annunciation operation from between annunciation methods listed in the table shown in FIG. 3 n response to an unfolded/folded state of the body of the foldable portable telephone set. It is assumed, however, that only singing by the speaker 12 is utilized as an annunciation device in FIG. 3 and the singing by the speaker 12 involves two different annunciation patterns (for example, a melody and beep sound) including an annunciation pattern α and another annunciation pattern β which has a lower annunciation capacity but exhibits lower consumption power than the annunciation method α. Further, it is assumed that the annunciation sound volume in FIG. 3 indicates a possible minimum volume and the annunciation sound volume 3 is a possible maximum volume.

Now, it is assumed that the portable telephone set receives a terminating call while the body thereof is folded (a closed state) (step 101). The control section 3 receives a call signal from the radio section 2 and requests the annunciation method determination section 6 to decide an annunciation method to be used based on an unfolded/folded state at present of the body of the portable telephone set detected by the unfolded/folded state detection section 7. The annunciation method determination section 6 receives the request from the control section 3 and discriminates that the unfolded/folded state detection section 7 detects that the body of the portable telephone set is in a closed state, that is, the body of the portable telephone set is in a folded state (step 102). Then, the annunciation method determination section 6 determines based on the storage section 5 (that is, the table of the annunciation methods of FIG. 3) that the annunciation method A (with the annunciation sound volume 3 and the annunciation pattern α) is used for annunciation (step 103) and sends a replay of the use of the determined annunciation method A to the control section 3. Then, the control section 3 controls the annunciation section 10 to drive the speaker 12 in accordance with the annunciation method A to perform a call termination annunciation operation by singing (step 105).

On the other hand, if a call terminates at the portable telephone set while the body thereof is in an unfolded state, then the annunciation method B (with the annunciation sound volume 1 and the annunciation pattern β) is selected by the annunciation method determination section 6 (step 104). Thereafter, the control section 3 controls the annunciation section 10 to drive the speaker 12 in accordance with the annunciation method B to perform a termination annunciation operation by singing in a similar manner as described above (step 105).

In this manner, since the annunciation device, annunciation sound volume, annunciation pattern and so forth are changed over in response to the unfolded/folded state of the foldable portable telephone set such that termination annunciation is controlled when the user performs some operation with the portable telephone set unfolded, reduction of power consumption and noise upon annunciation of a terminating call can be realized.

A different, more effective set of annunciation methods may be used in place of the annunciation methods described here in above with reference to FIG. 3. For example, such methods as illustrated in FIG. 4 or 5 may be used.

Referring first to FIG. 4, it is defined that the annunciation method wherein the body of the portable telephone set is in a folded state (closed state) is a method A, and the annunciation method wherein the body of the portable telephone set is in an unfolded (open) state without being folded is a method B. Further, in FIG. 4, not only singing (the speaker 12) but also vibration (the vibrator 11) are used as the annunciation device, and termination of a call when the body of the portable telephone set is in a folded state is announced by singing (with the annunciation sound volume 3 and the singing pattern alpha.) whereas termination of a call when the body of the portable telephone set is in an unfolded state is announced by vibration. Consequently, a portable telephone set can achieve a volume reduction even further than that of the annunciation method configuration of FIG. 3. Further, if not vibration but a light emitting element (the LED 13) is used as the annunciation device for the annunciation method B, then although the annunciation capacity is a little poor, reduction of power consumption than that by provided by vibration can be expected.

Recently, also a portable telephone set has a mailing function of an electronic mail or the like and can transmit and receive an electronic mail or the like. Naturally, the foldable portable communication terminal apparatus described above can be applied to a termination annunciation operation upon reception of such an electronic mail as just mentioned. For the termination annunciation operation of an electronic mail or the like, not only the annunciation device, annunciation sound volume and annunciation pattern but also the annunciation time can be used as components of the annunciation method as seen in FIG. 5. It is to be noted that, also in FIG. 5, it is defined that the annunciation method wherein the body of the portable telephone set is in a folded state (close state) is as a method A, and the annunciation method wherein the body of the portable telephone set is in an unfolded state (open state) is as a method B in a similar manner as in FIG. 4.

In FIG. 5, the annunciation time period is merely changed over depending upon the unfolded/folded state of the body of the portable telephone set. However, only this can achieve reduction of consumption power. It is to be noted that naturally the example of the annunciation method configuration can be applied not only to annunciation of termination of a call from the outside but also to an annunciation operation which is performed only by internal processing of the portable telephone set, an alarming annunciation operation, for example, of a scheduling function and so forth.

As described above, the foldable portable communication terminal apparatus can comply with various requests of the user by employing suitable configurations of annunciation methods. Accordingly, the foldable portable telephone set can flexibly comply with needs of the user by permitting the user to rewrite the annunciation methods stored in the storage section 5.

Figure 6:
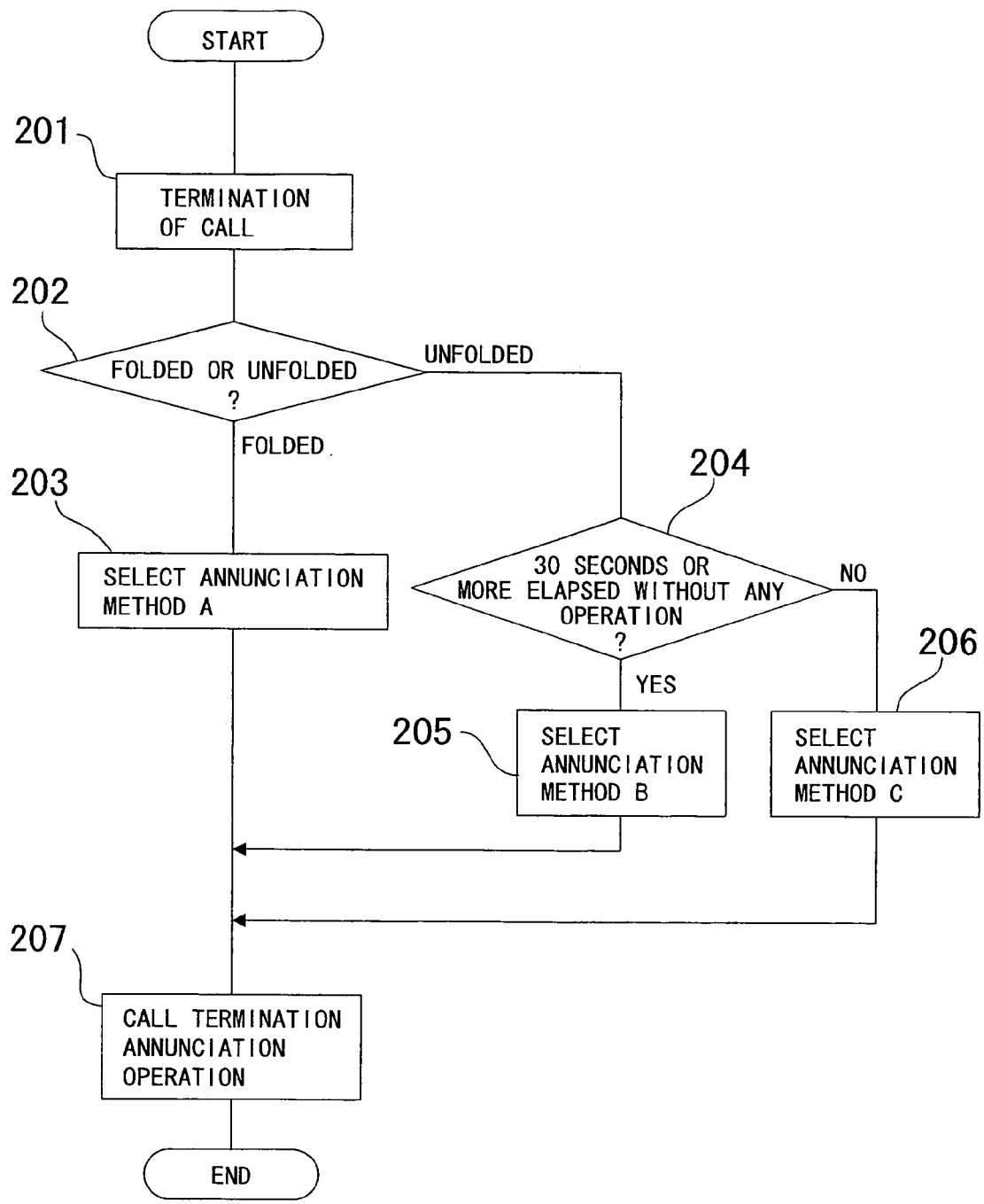
FIG. 6 is a flow chart illustrating another process which can be executed by the foldable portable communication terminal apparatus of FIG. 1.

FIG. 6 illustrates another process which can be executed by the foldable portable communication terminal apparatus of FIG. 1, and FIG. 7 a combination of annunciation methods which can be used in the process illustrated in FIG. 6.

In the process illustrated in FIG. 6, the process described here in above with reference to FIG. 2 is applied and modified such that, if a call is terminated at the foldable portable telephone set while it is in an unfolded state, the annunciation method to be used is changed over also depending upon the elapsed time after the last operation is performed by the user.

Here, it is assumed that the control section 3 can always grasp a no-operation time of the inputting section 8 by the user while the portable telephone set is in an unfolded state. In particular, the unfolded/folded state detection section 7 always monitors an unfolded/folded state of the portable telephone set and immediately notifies the control section 3 if an unfolding or folding operation is performed. The control section 3 recognizes unfolding or folding of the portable telephone set based on the notification of the unfolded/folded state detection section 7. In this instance, if unfolding of the portable telephone set is recognized, then the control section 3 starts measurement of time from that point of time. Thereafter, if an operation of the user is performed through the inputting section 8, then the measurement time is reset every time and the measurement is re-started from the beginning. The control section 3 forms time measurement means. Further, the time measurement is performed only while the portable telephone set remains unfolded, but the time measurement function is stopped at the point of time when the portable telephone set is folded.

Such an annunciation method configuration as seen in FIG. 7 is stored in the storage section 5. In particular, the annunciation method determination section 6 determines an annunciation method to be used in a termination annunciation operation in response to an unfolded/folded state of the body of the portable telephone set from among annunciation methods illustrated in FIG. 7. It is to be noted that the annunciation method configuration of FIG. 7 includes three difference annunciation methods including a method A which uses singing by the speaker 12, another method B which uses vibration by the vibrator 11, and a further method C which uses emission of light from the LED 13 as the annunciation device. The singing by the speaker 12 includes two annunciation patterns including a pattern α and another pattern β which has a lower annunciation capacity but exhibits lower power consumption that the pattern α. The annunciation sound volume is minimum when it is 1 but is maximum when it is 3. Further, the annunciation time is determined only for an annunciation operation of reception of a mail, alarming or the like.

Now, it is assumed that a call is terminated at the portable telephone set while the body thereof is in a folded state (step 201). The control section 3 receives a call signal from the radio section 2 and requests the annunciation method determination section 6 for decision of an annunciation method to be used based on an unfolded/folded state of the body of the portable telephone set at present detected by the unfolded/folded state detection section 7. The annunciation method determination section 6 receives the request from the control section 3 and discriminates that the body of the portable telephone set is currently in a folded state (step 202). Then, the annunciation method determination section 6 determines from the storage section 5 (that is, the table of FIG. 7) that the annunciation method A (with the singing and emission of light, annunciation sound volume 3, annunciation pattern α, and annunciation time of 5 seconds for an annunciation operation of a mail or the like) is used to perform annunciation and gives a reply of the determined contents to the control section 3 (step 203). Then, the control section 3 controls the annunciation section 10 to perform a termination annunciation operation using the annunciation method A (step 207).

On the other hand, if a call is terminated at the portable telephone set while the body of the portable telephone set is unfolded, then the annunciation method determination section 6 detects no-operation time of the user measured by the control section 3 and discriminates whether or not the elapsed no-operation time is 30 seconds or more (step 204). If the elapsed non-operation time is 30 seconds or more, then the annunciation method determination section 6 determines that the annunciation method B (with the singing, annunciation sound volume 1, annunciation pattern β, and annunciation time of 3 seconds) is used to perform annunciation and gives a reply of the determined contents to the control section 3 (step 205). Then, the control section 3 controls the annunciation section 10 to perform a termination annunciation operation using the annunciation method B (step 207).

On the other hand, if the discrimination in step 204 indicates that the elapsed non-operation time is less than 30 seconds, then the annunciation method determination section 6 determines that the annunciation method C (with the vibration or emission of light, and annunciation time of 1 second) is used to perform annunciation and gives a reply of the determined contents to the control section 3 (step 206). Then, the control section 3 similarly controls the annunciation section 10 to perform a termination annunciation operation using the annunciation method C (step 207).

The process described hereinabove with reference to FIG. 2 is inferior in that, even if the foldable portable telephone set is in an unfolded state, when the user is not operating the portable telephone set such as, for example, when the user is at a position spaced a little from the portable telephone set with the portable telephone set unfolded, the annunciation capacity is deteriorated and the user is less likely to notice the annunciation operation. With the process described above with reference to FIG. 6, however, the drawback just described can be prevented to some degree, and not only reduction of the power consumption and noise generation can be achieved but also annunciation of a higher degree of accuracy can be anticipated. Further, while, in FIG. 6, it is assumed that the discrimination criterion between the annunciation methods B and C based on the no-operation time of the user is 30 seconds, naturally this value is a mere aimed value at all and the value of the discrimination criterion can be freely changed by the user operating the inputting section.

As described above, it can be considered that the foldable portable communication terminal apparatus described above includes a foldable body, an annunciation section (the annunciation section 10, vibrator 11, speaker 12 and LED 13) for performing an annunciation operation, a storage section 5 for storing a plurality of annunciation methods, an unfolded/folded state detection section 7 for supervising opening or closing of the body, an annunciation method determination section 6 for selecting one of the annunciation methods stored in the storage section 5 in response to an unfolded/folded state of the body detected by the unfolded/folded state detection section 7, a control section 3 for controlling, when annunciation is necessary, the annunciation section to perform an annunciation operation in accordance with the annunciation method selected by the annunciation method determination section 6, and a manually operable inputting section 8, the annunciation methods stored in the storage section being capable of being rewritten arbitrarily through the inputting section 8. Accordingly, since the annunciation methods can be changed through the inputting section 8, various annunciation methods can be performed with a simple configuration. Further, when an annunciation operation is required upon termination of a call or the like, the annunciation device, annunciation sound volume, annunciation pattern, annunciation time are so forth are suitably changed depending upon whether the information terminal apparatus is folded or unfolded so that a suitable annunciation operation is performed in accordance with a situation of use of the information terminal apparatus. For example, when the information terminal apparatus is in folded state, because the user has the information terminal apparatus carried in a bag or a pocket with a high degree of probability, an annunciation method which has higher power consumption but exhibits a higher annunciation capacity is used. On the other hand, when the information terminal apparatus is in an unfolded state, because the user is operating the information terminal apparatus with a high degree of probability, another annunciation method which has lower power consumption but exhibits a lower annunciation capacity is used. Consequently, the foldable portable communication terminal apparatus is advantageous in that an unnecessary annunciation operation is prevented from being performed wastefully and the power consumption and the noise generation can be reduced.

Also it can be considered that the foldable portable communication terminal apparatus described above includes a foldable body, an annunciation section (the annunciation section 10, vibrator 11, speaker 12 and LED 13) for performing an annunciation operation, a storage section 5 for storing a plurality of annunciation methods, an unfolded/folded state detection section 7 for supervising unfolding or folding of the body, an annunciation method determination section 6 for selecting one of the annunciation methods stored in the storage section 5 in response to the unfolded/folded state of the body detected by the unfolded/folded state detection section 7, a control section 3 for controlling, when annunciation is necessary, the annunciation section to perform an annunciation operation in accordance with the annunciation method selected by the annunciation method determination section 6, a manually operable inputting section 8, and a time counting section for counting time (no-operation time) in which the inputting section 8 is not operated after it is detected by the unfolded/folded state detection section 7 that the body is in an unfolded state, the annunciation method determination section 6 selecting, when the body is in an unfolded state, one of the annunciation methods stored in the storage section 5 based on the time counted by the time counting section. Accordingly, various annunciation operations can be performed with a simple configuration. Further, when an annunciation operation is required upon termination of a call or the like, the annunciation device, annunciation sound volume, annunciation pattern, annunciation time are so forth are suitably changed depending upon whether the information terminal apparatus is folded or unfolded so that a suitable annunciation operation is performed in accordance with a situation of use of the information terminal apparatus. For example, when the information terminal apparatus is in folded state, because the user has the information terminal apparatus carried in a bag or a pocket with a high degree of probability, an annunciation method which has higher power consumption but exhibits a higher annunciation capacity is used. On the other hand, when the information terminal apparatus is in an unfolded state, because the user is operating the information terminal apparatus with a high degree of probability, another annunciation method which has lower power consumption but exhibits a lower annunciation capacity is used. Consequently, the foldable portable communication terminal apparatus is advantageous in that an unnecessary annunciation operation is prevented from being performed wastefully and the power consumption and the noise generation can be reduced.

Where the annunciation means includes the speaker 12 and the annunciation methods stored in the storage section 5 include at least one changeable parameter which is the annunciation sound volume, annunciation pattern or annunciation time of the speaker 12, various manners of annunciation can be anticipated.

While the portable communication terminal apparatus of the embodiment of the present invention has been described in detail with reference to the accompanying drawings, the present invention is not limited to the specific embodiment described above, but it is to be understood that changes and variations may be made without departing from the spirit or scope of the following claims. For example, while the portable communication terminal apparatus described above is formed as a portable telephone set, the present invention is not limited to this and can be applied to any portable communication terminal apparatus having a foldable body such as a personal handy-phone system (PHS) terminal, a personal portable information terminal apparatus (personal digital assistant) or a portable personal computer. Further, while the present invention is applied basically to an apparatus which can communicate with the opposite side apparatus directly or indirectly by radio or by a wire circuit, the present invention can be applied also to an apparatus which does not specifically has a communication function as recognized from the example of annunciation of an alarm described hereinabove.

What is claimed is:

1. A portable communication terminal apparatus having a foldable body, comprising:
    annunciation means configured to perform a plurality of annunciation operations;
    first, second, and third annunciation methods configured to issue an annunciation of first, second, and third patterns, wherein the third pattern exhibits higher power consumption and higher annunciation ability than do the first and second patterns;

storage section configured to store the annunciation methods;

detection section configured to determine whether said body includes a folded or an unfolded state;

annunciation method determination section configured to select the first or second annunciation method in response to the unfolded state, and the third annunciation method in response to the folded state; and control section configured to control said annunciation means to perform one of the plurality of annunciation operations in accordance with the annunciation method selected by said annunciation method determination section.

2. The portable communication terminal apparatus as claimed in claim 1, wherein said annunciation means includes a sounding body, and the annunciation methods stored in said storage section include a changeable parameter, which includes at least one of an annunciation sound volume, an annunciation pattern, or an annunciation time of said sounding body.

3. The portable communication terminal apparatus as claimed in claim 1, wherein said annunciation means includes a sounding body and a vibrator, and one of said annunciation methods operates said sounding body and said vibrator, and another one of said annunciation methods operate said sounding body or said vibrator.

4. The portable communication terminal apparatus as claimed in claim 1, wherein said annunciation means includes a sounding body and a light emitting element, and one of said annunciation methods operates said sounding body and said light emitting element, and another one of said annunciation methods operate said sounding body and said light emitting element.

5. The portable communication terminal as claimed in claim 1 further comprising a time counting means configured to:

count a time during which no input is received and the foldable body is in the unfolded state, and starting when the foldable body is placed into the unfolded state, if the time during which no input is received and the foldable body is in the unfolded state reaches a first period, the first annunciation method issues the annunciation of the first pattern, and if the time reaches a second period, the second annunciation method issues the annunciation of the second pattern.

6. The portable communication terminal as claimed in claim 5 wherein the second period is longer than the first period.

7. The portable communication terminal as claimed in claim 5 wherein the first annunciation method is different from the second annunciation method.

8. The portable communication terminal as claimed in claim 5 wherein the first pattern is different from the second pattern.

9. The portable communication terminal apparatus as claimed in claim 1 further comprising an inputting section.

10. The portable communication terminal apparatus as claimed in claim 9 wherein said inputting section is configured to rewrite the annunciation methods stored in said storage section.

11. The portable communication terminal apparatus as claimed in claim 9, further comprising:

a time counting means configured to count a time during which said inputting section is not operated and said body is in the unfolded state; and wherein said annunciation method determination section is further configured to select the first or second annunciation methods stored in said storage section based on the time counted by said time counting means when said body is in the unfolded state.

12. The portable communication terminal apparatus as claimed in claim 11, wherein, if the time during which said inputting section is not operated and the foldable body is in the unfolded state reaches a first period, the first annunciation method issues the annunciation of the first pattern, and if the time reaches a second period, the second annunciation method issues the annunciation of the second pattern.

13. The portable communication terminal as claimed in claim 12 wherein the second period is longer than the first period.

14. The portable communication terminal as claimed in claim 12 wherein the first annunciation method is different from the second annunciation method.

15. The portable communication terminal as claimed in claim 12 wherein the first pattern is different from the second pattern.

* * * * *